United States Patent
Young et al.

(10) Patent No.: US 7,606,171 B1
(45) Date of Patent: Oct. 20, 2009

(54) SKELETAL NODE RULES FOR CONNECTED DOMINATING SET IN AD-HOC NETWORKS

(75) Inventors: C. David Young, Plano, TX (US); Subbarayan Venkatesan, Plano, TX (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 707 days.

(21) Appl. No.: 11/191,876

(22) Filed: Jul. 28, 2005

(51) Int. Cl.
*H04L 12/28* (2006.01)
(52) U.S. Cl. .................................................. 370/254
(58) Field of Classification Search ................. 370/225, 370/254, 310
See application file for complete search history.

(56) References Cited

U.S. PATENT DOCUMENTS

| | | | |
|---|---|---|---|
| 4,504,946 A | 3/1985 | Raychaudhuri | 370/322 |
| 4,763,322 A | 8/1988 | Eizenhofer | 370/337 |
| 5,012,469 A | 4/1991 | Sardana | 370/322 |
| 5,117,422 A | 5/1992 | Hauptschein et al. | 370/255 |
| 5,245,609 A | 9/1993 | Ofek et al. | 370/348 |
| 5,295,140 A | 3/1994 | Crisler et al. | 370/443 |
| 5,396,496 A | 3/1995 | Ito et al. | 370/314 |
| 5,420,858 A | 5/1995 | Marshall et al. | 370/352 |
| 5,448,698 A | 9/1995 | Wilkes | 395/200.01 |
| 5,450,394 A | 9/1995 | Gruber et al. | 370/17 |
| 5,457,681 A | 10/1995 | Gaddis et al. | 370/402 |
| 5,502,722 A | 3/1996 | Fulghum | 370/69 |
| 5,506,848 A | 4/1996 | Drakopoulos et al. | 370/336 |
| 5,568,477 A | 10/1996 | Galand et al. | 370/60 |
| 5,581,548 A | 12/1996 | Ugland et al. | 370/330 |
| 5,594,720 A | 1/1997 | Papadopoulos et al. | 370/330 |
| 5,598,417 A | 1/1997 | Crisler et al. | 370/348 |
| 5,613,198 A | 3/1997 | Ahmadi et al. | 370/337 |
| 5,625,629 A | 4/1997 | Wenk | 370/330 |
| 5,644,576 A | 7/1997 | Bauchot et al. | 370/437 |
| 5,652,751 A | 7/1997 | Sharony | 340/2.4 |
| 5,696,903 A | 12/1997 | Mahany | 709/228 |
| 5,719,868 A | 2/1998 | Young | 370/436 |
| 5,742,593 A | 4/1998 | Sharony et al. | 370/330 |
| 5,748,362 A | 5/1998 | Delacourt et al. | 359/326 |
| 5,909,469 A | 6/1999 | Frodigh et al. | 375/302 |
| 5,920,703 A | 7/1999 | Campbell et al. | 709/236 |
| 5,949,760 A | 9/1999 | Stevens et al. | 370/280 |
| 5,953,344 A | 9/1999 | Dail et al. | 370/337 |
| 5,983,259 A | 11/1999 | Campbell et al. | 709/200 |
| 6,014,089 A | 1/2000 | Tracy et al. | 340/870.02 |
| 6,018,528 A | 1/2000 | Gitlin et al. | 370/436 |

(Continued)

OTHER PUBLICATIONS

L. Pond and V. Li, "Bridging the Gap Interoperability, Survivability, Security," 1989 IEEE MILCOM, Conference Record, vol. 1 of 3.

(Continued)

*Primary Examiner*—Dang T Ton
*Assistant Examiner*—Kevin Lee
(74) *Attorney, Agent, or Firm*—Daniel M. Barbieri (57) ABSTRACT

A method of establishing an arterial sub-network of nodes in a communications network is disclosed. According to the method, the one-hop neighbor sets of each node are compared with the one-hop neighbor sets of the neighbors of each node, and a set of rules are applied to determine whether or not each node is to be part of the arterial sub-network.

8 Claims, 4 Drawing Sheets

U.S. PATENT DOCUMENTS

| | | | |
|---|---|---|---|
| 6,031,827 A | 2/2000 | Rikkinen et al. | 370/330 |
| 6,084,888 A | 7/2000 | Watanabe et al. | 370/473 |
| 6,084,889 A | 7/2000 | Murakami | 370/474 |
| 6,088,659 A | 7/2000 | Kelley et al. | 702/62 |
| 6,094,425 A | 7/2000 | Auger et al. | 370/330 |
| 6,094,429 A | 7/2000 | Blanchette et al. | 370/337 |
| 6,122,293 A | 9/2000 | Frodigh et al. | 370/473 |
| 6,151,319 A | 11/2000 | Dommety et al. | 370/395.52 |
| 6,157,656 A | 12/2000 | Lindgren et al. | 370/458 |
| 6,252,868 B1 | 6/2001 | Diachina et al. | 370/347 |
| 6,256,304 B1 | 7/2001 | Vayrynen | 370/350 |
| 6,256,477 B1 | 7/2001 | Eidson et al. | 455/63.3 |
| 6,275,506 B1 | 8/2001 | Fazel et al. | 370/459 |
| 6,304,559 B1 | 10/2001 | Jacklin et al. | 370/310 |
| 6,310,867 B1 | 10/2001 | Tat et al. | 370/254 |
| 6,314,084 B1 | 11/2001 | Kahale et al. | 370/230 |
| 6,317,436 B1 | 11/2001 | Young et al. | 370/443 |
| 6,324,184 B1 | 11/2001 | Hou et al. | 340/7.43 |
| 6,331,973 B1 | 12/2001 | Young et al. | 370/337 |
| 6,353,598 B1 | 3/2002 | Baden et al. | 370/280 |
| 6,353,605 B1 | 3/2002 | Rautanen et al. | 370/337 |
| 6,369,719 B1 | 4/2002 | Tracy et al. | 340/870.02 |
| 6,384,739 B1 | 5/2002 | Roberts, Jr. et al. | 340/905 |
| 6,389,273 B1 | 5/2002 | Brandenburg | 455/296 |
| 6,414,955 B1 | 7/2002 | Clare et al. | 370/390 |
| 6,442,157 B1 | 8/2002 | Carter et al. | 370/347 |
| 6,466,793 B1 | 10/2002 | Wallstedt et al. | 455/450 |
| 6,469,996 B1 | 10/2002 | Dupuy | 370/337 |
| 6,487,186 B1 | 11/2002 | Young et al. | 370/336 |
| 6,498,667 B1 | 12/2002 | Masucci et al. | 398/98 |
| 6,504,829 B1 | 1/2003 | Young et al. | 370/337 |
| 6,515,972 B1 | 2/2003 | Gage et al. | 370/328 |
| 6,529,443 B2 | 3/2003 | Downey et al. | 367/76 |
| 6,553,424 B1 | 4/2003 | Kranz et al. | 709/234 |
| 6,556,899 B1 | 4/2003 | Harvey et al. | 701/29 |
| 6,557,142 B2 | 4/2003 | Morris et al. | 714/815 |
| 6,574,206 B2 | 6/2003 | Young | 370/337 |
| 6,600,754 B1 | 7/2003 | Young et al. | 370/459 |
| 6,628,636 B1 | 9/2003 | Young | 370/337 |
| 6,631,124 B1 | 10/2003 | Koorapaty et al. | 370/337 |
| 6,643,322 B1 | 11/2003 | Varma et al. | 375/227 |
| 6,711,177 B1 | 3/2004 | Young et al. | 370/468 |
| 6,771,626 B1 | 8/2004 | Golubiewski et al. | 370/336 |
| 6,781,967 B1 | 8/2004 | Young et al. | 370/312 |
| 6,791,994 B1 | 9/2004 | Young et al. | 370/436 |
| 6,810,022 B1 | 10/2004 | Young et al. | 370/280 |
| 6,885,651 B1 | 4/2005 | Young | 370/337 |
| 6,912,212 B1 | 6/2005 | Young | 370/337 |
| 6,980,537 B1 * | 12/2005 | Liu | 370/338 |
| 2002/0001294 A1 | 1/2002 | Amouris | 370/337 |
| 2002/0018448 A1 * | 2/2002 | Amis et al. | 370/255 |
| 2002/0062388 A1 * | 5/2002 | Ogier et al. | 709/238 |
| 2003/0202574 A1 | 10/2003 | Budka et al. | 375/227 |
| 2005/0041676 A1 * | 2/2005 | Weinstein et al. | 370/401 |

OTHER PUBLICATIONS

Bittle, Caples, Young, "Soldier Phone: An Innovative Approach to Wireless Multimedia Communications," 1998 IEEE MILCOM, vol. 3.

Sunlin, "A Hybrid Distributed Slot Assignment TDMA Channel Access Protocol," IEEE Military Communications Conference, 1990, vol. 3 of 3.

Young and Stevens, "Clique Activation Multiple Access (CAMA): A Distributed Heuristic for Building Wireless Datagram Networks," IEEE Military Communications Conference 1998, vol. 1 I. Chlamtac and A. Farago, "An Optimal Channel Access Protocol with Multiple Reception Capacity," Dept. of Telecommunications & Telematics, Technical University of Budapest, Budapest, Hungary. Publication date unknown; believed to be 1993.

Ju et al. "An Optimal Topology-Transport Scheduling Method in Multihop Packet Radio Networks." IEEE/ACM Transactions on Networking. Jun. 1998. pp. 298-306.

Chakraborty et al. "Generic Algorithm for Broadcast Scheduling in Packet Radio Networks," Evolutionary Computation Proceedings, 1998. IEEE World Congress on Computational Intelligence. May 4-9, 1998. pp. 183-188.

Pond et al. "A Distributed Time-Slot Assignment Protocol for Mobile Multi-Hop Broadcast Packet Radio Networks," IEEE MILCOM, 1989. Oct. 15-18, 1989. pp. 70-74.

Arikan, E. "Some Complexity Results about Packet Radio Networks," IEEE Transactions on Information Theory, v.IT-30, No. 4, Jul. 1984, pp. 681-685.

Chou et al. "Slot Allocation Strategies for TDMA Protocols in Multihop Packet Radio Network." Eleventh Annual Joint Conference of the IEEE Computer and Communications Societies. May 4-8, 1992. pp. 710-716.

Oono et al. "Dynamic Slot Allocation Technology for Mobile Multi-Media TDMA Systems Using Distributed Control Scheme," IEEE. Oct 12-16, 1997. pp. 74-78.

Young, "USAP: A Unifying Dynamic Distributed Multichannel TDMA Slot Assignment Protocol," Proc. IEEE MILCOM 1996, vol. 1, Oct. 1996.

U.S. Appl. No. 10/811,000, "Network Routing Process for Regulating Traffic Through Advantaged and Disadvantaged Nodes," filed Mar. 26, 2004, Fred D. Mabe et al.

U.S. Appl. No. 09/303,802, "Clique Activation Multiple Access," filed Apr. 30, 1999, C. D. Young et al.

U.S. Appl. No. 10/689,448, "Heuristics for Combining Inter-Channel and Intra-Channel Communications in a Wireless Environment," filed Oct. 20, 2003, C. David Young et al.

U.S. Appl. No. 10/847,786, "On-Demand Broadcast Protocol," filed May 18, 2004, C. David Young et al.

U.S. Appl. No. 10/867,481, "Artery Nodes," filed Jun. 14, 2004, C. David Young et al.

U.S. Appl. No. 10/782,716, "Hybrid Open/Closed Loop Filtering For Link Quality Estimation," filed Feb. 19, 2004, Steven L. VanLaningham et al.

* cited by examiner

SKELETAL NODE RULES FOR CONNECTED DOMINATING SET IN AD-HOC NETWORKS

FIELD OF THE INVENTION

The invention relates to communications, and more particularly, to a system and method for communicating over a wireless network.

BACKGROUND OF THE INVENTION

Wireless communications networks have found great utility in many commercial and military applications. However, some types of wireless networks become less efficient in transmitting information when a large number of nodes are attempting to communicate thereon.

One challenge faced in communications networks is the scheduling of communications slots for each node in the network. In networks with small numbers of nodes it may be efficient to permanently assign a recurring communication slot to each node according to a predetermined schedule. Where large numbers of nodes are involved, however, the permanent pre-assignment of slots may create an unacceptably long communication cycle as each node waits its turn to communicate according to the predetermined schedule. The addition of multiple frequencies or channels may reduce delays by creating more communication slots, but fielded transceivers may not be equipped to communicate on the number of channels required for a large-scale, multi-channel, low delay network.

Attempts to assign priority to certain nodes in a network have included the concept of artery nodes, which has been disclosed and described in U.S. patent application Ser. No. 10/867,481, "Artery Nodes," filed Jun. 14, 2004, having inventors C. David Young et al. and assigned to the same assignee as the present application, the disclosure of which is incorporated herein by reference in its entirety. Artery nodes are nodes that form an interconnected arterial sub-network within the network and that assign slots to neighboring nodes. A sub-network of artery nodes has been found to efficiently manage network communications in many different network topology types. However, as currently defined the concept of artery nodes may not converge within a satisfactory time for some network topologies. Furthermore, the network may be required to redefine each node's status as an artery node or as a non-artery node each time a node enters or leaves the network. When nodes are constantly entering and exiting a communications network in an ad-hoc fashion, the network may not converge to an artery sub-network solution by the time another node enters or exits the network.

It is therefore an object of the invention to provide a communications network that efficiently manages a large number of nodes.

It is another object of the invention to provide a method of quickly converging on an arterial subnetwork within a communications network A feature of the invention is the application of a set of rules that reduce the time necessary to form an interconnected, minimal arterial sub-network within a communications network, where the nodes in the arterial sub-network assign communication slots to neighboring nodes.

An advantage of the invention is a decrease in time necessary for a network to converge to an arterial sub-network solution.

Another advantage of the invention is that the resulting arterial sub-network is minimal.

SUMMARY OF THE INVENTION

The invention provides a method of establishing an arterial sub-network of nodes in a communications network. According to the method, the one-hop neighbor sets of each node are compared with the one-hop neighbor sets of the neighbors of each node, and a set of rules are applied to determine whether or not each node is to be part of the arterial sub-network.

The invention also provides a method of establishing an arterial sub-network of nodes in a communications network comprised of a plurality of nodes such that each of the plurality of nodes in the communications network is within one hop of a node in the arterial sub-network. According to the method, a first node of the plurality of nodes is assigned to be part of the arterial sub-network when a set comprising the one-hop neighbors of the first node is a proper superset of each of the first node's one-hop neighbors' sets of neighbors.

The invention also provides a method of establishing an arterial sub-network of nodes in a communications network comprised of a plurality of nodes, the arterial network characterized in that each node in the network is within one hop of a node in the arterial sub-network. According to the method, a first node of the plurality of nodes is assigned to be part of the arterial sub-network when a set comprising all one-hop neighbors of the first node is not a proper subset of any of the first node's one-hop neighbor's sets, where the set comprising the one-hop neighbors of the first node is a proper superset of at least one of the first node's one-hop neighbor's sets of neighbors, or the set comprising the one-hop neighbors of the first node is the same as the one-hop neighbor sets of each of the one-hop neighbors of the first node, and where an identifier of the first node is different from identifiers of the one-hop neighbors of the first node such that the identifier of the first node prioritizes the first node over the one-hop neighbors of the first node.

The invention also provides a method of establishing an arterial sub-network of nodes in a communications network comprised of a plurality of nodes, the arterial network characterized in that each node in the network is within one hop of a node in the arterial sub-network. According to the method, a first node of the plurality of nodes is assigned to be part of the arterial sub-network when for the nodes of the set comprising the one-hop neighbors of the first node, the intersection of the neighbor sets of said nodes have the same number of neighbors where the ID of said first node is greater than the ID of all the nodes in the intersection.

The invention also provides a method of establishing an arterial sub-network of nodes in a communications network having a plurality of nodes such that each of the plurality of nodes in the communications network is within one hop of a node in the arterial sub-network. According to the method, a first node of the plurality of nodes is assigned to be part of the arterial sub-network when one-hop neighbors of the first node have sets of neighbors, where the sets have no nodes in common.

The invention further provides, in a communications network comprised of a plurality of nodes, a method of determining whether each node is to be assigned as part of an arterial sub-network of nodes defined such that each of the plurality of nodes in the communications network is within one hop of a node in the arterial sub-network. According to the method, all one-hop neighbors of a first node are entered into a set. The first node is assigned to not be part of the arterial sub-network when one of (a) the set of one-hop neighbors of the first node is a proper subset of another node's one-hop neighbors, (b) the set of one-hop neighbors of the first node is equal to a set of one-hop neighbors of a second node, and the identifier of the first node is different from an identifier of the second node such that the identifiers prioritize the second node over the first node, and (c) all nodes in the intersection of the neighbor sets have the same number of neighbors where node i's ID is less than the ID of one of these said nodes or one of said nodes has more neighbors than node i is true.

The invention further provides, in a communications network comprised of a plurality of nodes, a method of determining whether a node in the network is part of an arterial sub-network of nodes defined such that each of the plurality of nodes in the communications network is within one hop of a node in the arterial sub-network. According to the method, each node is assigned to not be a part of the arterial sub-network when said each node has a set of neighbors that is different from at least one of said each node's neighbors' neighbor sets and said each node's neighbors are either directly connected or they are connected by a node having one-hop neighbors that are reporting disjoint sets of one-hop neighbors.

The invention also provides an ad-hoc communications network having a plurality of nodes. Each of the plurality of nodes has a set of one-hop neighbors, the one hop neighbors of each node being nodes directly communicating with said each node. The network also includes an arterial, connected sub-network within the plurality of nodes. The arterial sub-network assigns communication resources to adjacent nodes that are not part of the arterial sub-network. Each of the plurality of nodes are assigned to be part of the arterial sub-network when one of (a) the set of one-hop neighbors of said each node is a proper superset of each of said each node's one-hop neighbors' sets of neighbors, (b) the set of one-hop neighbors of said each node is not a proper subset of any of said each node's one-hop neighbor's sets, where the set of said each node's one-hop neighbors is a proper superset of at least one of said each node's one-hop neighbor's sets of neighbors, or the set of said each node's one-hop neighbors is the same as the one-hop neighbor sets of each of said each node's one-hop neighbors, and where an identifier of said each node is different from identifiers of the one-hop neighbors of said each node such that the identifier of said each node prioritizes said each node over the one-hop neighbors of said each node, (c) for the nodes of the set comprising the one-hop neighbors of the first node, the intersection of the neighbor sets of said nodes have the same number of neighbors where node i's ID is greater than the ID of all the nodes in the intersection and (d) one-hop neighbors of said each node have unconnected sets of one-hop neighbors are true. Each node is assigned to not be part of the arterial sub-network when one of (e) the set of one-hop neighbors of said each node is a proper subset of another node's one-hop neighbors, (f) the set of one-hop neighbors of said each node is equal to a set of one-hop neighbors of another node, and the identifier of said each node is different from an identifier of said another node such that the identifiers prioritize said another node over said each node, (g) said each node has a set of neighbors that is different from at least one of said each node's neighbors' neighbor sets and said each node's neighbors are either directly connected or they are connected by a node having one-hop neighbors that are reporting disjoint sets of one-hop neighbors, and (h) all nodes in the intersection of the neighbor sets have the same number of neighbors where said node's ID is less than the ID of one of said all nodes or one of said all nodes has more neighbors than said node are true, and further wherein said each node is assigned to be part of the arterial sub-network when none of conditions (a), (b), (c), (d), (e), (f), (g) or (h) are true and when one of said each node has no one-hop neighbors that are part of the arterial sub-network, and two one-hop neighbors of said each node each have a set of neighbors excluding said each node that are part of the arterial sub-network and the intersection of these sets is empty are true.

DETAILED DESCRIPTION OF THE DRAWINGS

Figure 1:
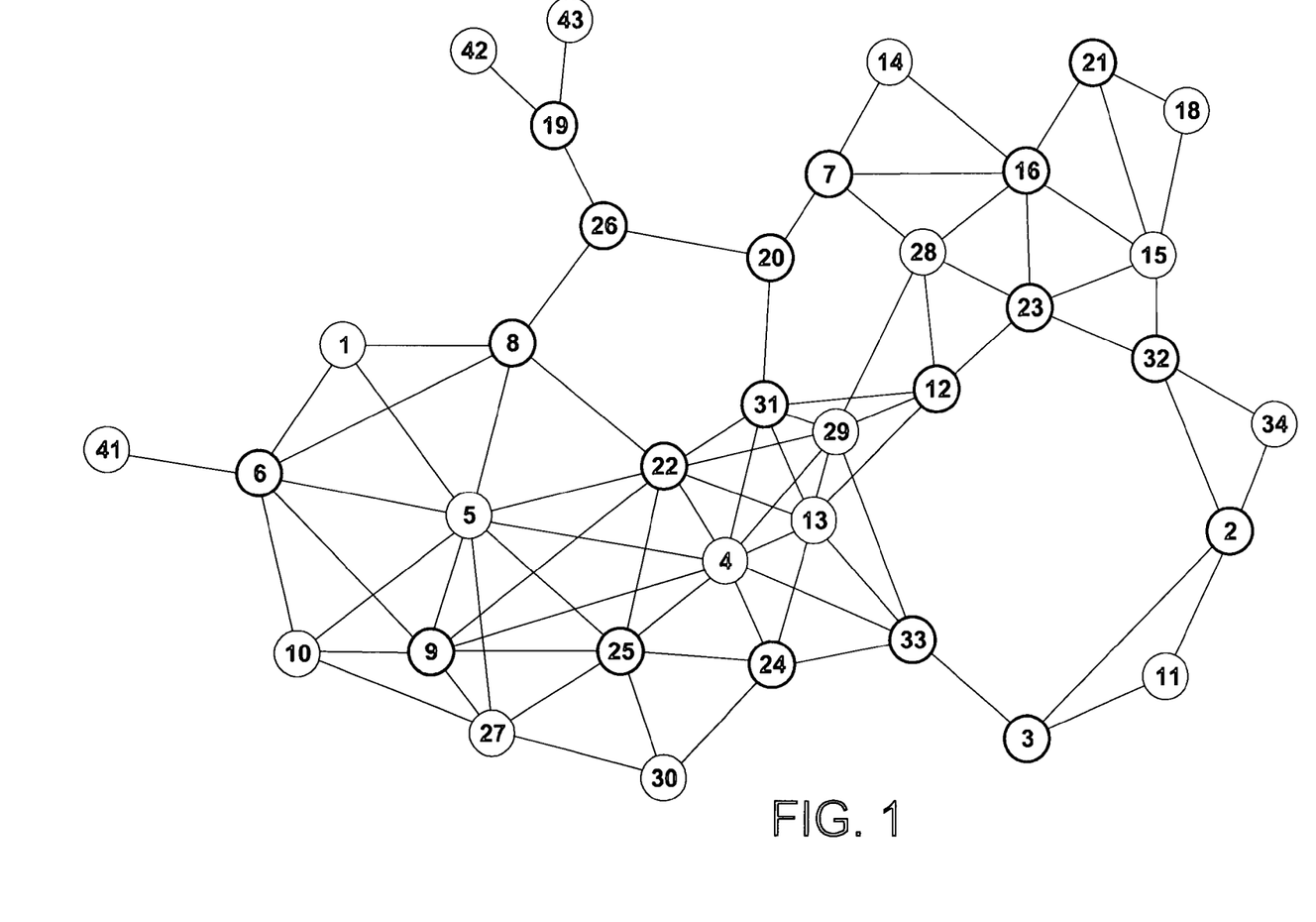
FIG. 1 is a schematic diagram of a communications network having a plurality of nodes.

Artery nodes are designed to improve the efficient use of channel resources for bursty traffic, which occurs when certain nodes in a network are permitted to increase their capacity and reduce their latency by assigning themselves time slots on one or more communications channels in which to broadcast information. The basic concept of artery nodes is disclosed in U.S. patent application Ser. No. 10/867,481, "Artery Nodes," filed Jun. 14, 2004, having inventors C. David Young et al. and assigned to the same assignee as the present application, the disclosure of which is incorporated herein by reference in its entirety. Under bursty traffic conditions it can be inefficient, and in very dense networks perhaps not even possible, to permanently assign every node a time slot since much of the time many nodes may have little to transmit. Network performance can be improved under these conditions if certain nodes reserve one or more time slots while the remaining nodes access these nodes using various access strategies. The nodes that reserve one or more broadcast slots can be termed artery nodes, and are selected to form an interconnected, arterial sub-network within the communications network. As shown in FIG. 1, dark circles are depicted around artery nodes 6, 8, 26, 19, 20, 7, 16, 21, 23, 12, 31, 22, 9, 25, 24, 33, 3, 2, and 32, while lighter circles are depicted around those nodes that are not artery nodes. The artery nodes assign themselves time slots which can be made available to the non-artery nodes using various protocols.

To determine whether a node should be an artery node, each node first defines a set of Artery Node Neighbors (ANN) as (a) the set of neighbors to the node that have announced themselves as artery nodes, and (b) the node itself if currently assigned to be an artery node. A node's neighbors are those nodes within one communication hop of the node, or in other words, those nodes that can directly communicate with the node. Each node announces its ANN set periodically in its monitor packets. The node will then examine the ANNs of its neighbors to decide if it should become an artery node. In doing so the following algorithm, known as the Artery Node Rule (ANR) is followed:

If ( (a node has no artery node neighbors)
   OR (two neighbor ANNs (excluding this node) are disjoint))
   be an artery node.
Else
   do not be an artery node.

This rule can be restated in an equivalent form as the Anti-Artery Node Rule (Anti-ANR) where the conditions are specified in which a node is not an artery node:

If ( (a node has an artery node neighbor)
   AND (no two neighbor ANNs (excluding this node) are disjoint))
   do not be an artery node.
Else
   be an artery node.

Taking node 6 in FIG. 1 as an example, if node 6 has no artery node neighbors, node 6 should be an artery node. Node 6 also should assign itself to be an artery node if the list of ANNs of any two neighbors of node 6 are disjoint or otherwise unconnected. If node 6 cannot satisfy either of these conditions, node 6 should not be an artery node. The ANR, and its restatement in the Anti-ANR, therefore yields an important set of properties. First, the ANR ensures that a non-artery node has an artery node neighbor. Second, the ANR connects artery nodes of a non-partitioned or undivided network into a non-partitioned arterial sub-network. Finally, the ANR prunes or eliminates unnecessary artery nodes without partitioning the arterial sub-network. What is left is a continuous, non-partitioned network of artery nodes with increased capacity and reduced latency due to the artery nodes' contentionless access to the communications channel. Because every node is, at most, one hop from the artery node network, contention along a route to any destination is limited to the first hop and is contention-free if an artery node is the source of a transmitted message. It has been found that a network of nodes employing the ANR to assign artery node status self-converges to a complete solution where every node is assigned artery node status or non-artery node status.

In a large communications network, there may be many nodes simultaneously connecting and disconnecting thereto, and it may be necessary to continually determine whether or not a particular node should assign itself as an artery node. To ensure convergence to an arterial sub-network solution, a randomization delay is enforced before a node performs the previously described algorithm. For example, before changing from a non-artery node state to an artery node state or vice-versa, a delay is waited. The delay may be completely random or may be a function of the number of nodes within one or two hops that reported a change in state in a previous reporting period. As the likelihood decreases that two simultaneously connecting nodes will be assigned the same randomization delay, the likelihood of simultaneously executing the algorithm for the nodes is lessened.

Even though the Artery Node Rule converges to an artery node solution on its own, additional rules can be applied to speed such convergence. The Skeletal Node Rules disclosed herein reduce convergence to an artery node solution and are especially advantageous in a large network or in an ad-hoc network in which nodes are continuously entering and exiting the network. In such circumstances swift convergence to an artery node solution can be critical to successful operation of the network.

The Skeletal Node Rules compare a node's list of neighbors with the lists provided by its neighbor nodes and categorizes the nodes into one of six node types. The first two types are described as "stable" because application of the ANR will always give the same result.

Stable artery node: a node that must be an artery node in the current topology
   Stable non-artery node: a node that cannot be an artery node in the current topology The next two node types are described as "bi-stable" because application of the ANR will not always give the same result, but application of the Skeletal Node Rules as presented herein will always give the same result.

Bi-stable artery node: a node that must be an artery node according to the Skeletal Node Rules, but may be a non-artery node using ANR
   Bi-stable non-artery node: a node that cannot be an artery node according to the Skeletal Node Rules, but may be an artery node using ANR The last two node types are described as random because such nodes do not fall into the previous categories, and application of the ANR with a randomization delay is a way to determine the artery node status of such nodes.

Random artery node: a node that is assigned artery node status using ANR with a randomization delay
   Random non-artery node: a node that is assigned non-artery node status using ANR with a randomization delay As previously stated, the Skeletal Node Rules inspect the neighbor sets (NSs) being reported by each of a node's neighbors. In all cases the neighbor set includes the reporting node but excludes the node itself. The rules also assume that the neighbor information advertised by each node includes each neighbor's stable artery status. The Skeletal Node Rules, expressed in terms of a node i, are as follows:

Stable Artery Node Rule (SANR): If node i has neighbors that are reporting disjoint sets of neighbors, then node i is a stable artery node (SAN). In the context of the invention, sets are disjoint when the nodes in each set are completely different from the nodes in other sets, or in other words, the sets have no nodes in common with each other. The SANR can be expressed as follows for node i and neighbors j and k:

$$\text{SANR} = (\exists j \neq k \ni \text{NS} j \cap \text{NS} k = \{i\})$$

Bi-Stable Artery Node Rule (BSANR): Node i is a bi-stable artery node when one of the following alternative definitions is satisfied:
     The neighbor set of node i is the proper superset of each of the neighbor's sets; or
     The neighbor set of node i is not the proper subset of any of its neighbors' sets and
       is the proper superset of some of the neighbor's sets or
       is the same as the set of each of its other neighbors where node i's ID is greater than (or alternatively, less than) the ID of these other neighbors, or
     all nodes in the intersection of the neighbor sets have the same number of neighbors where node i's ID is greater than the ID of all of said nodes.
   In the context of this application, a proper superset is a set that includes all nodes of subordinate sets and additional nodes. A proper subset is a set that is strictly contained in another set and thus excludes at least one member of said another set. The first two alternative definitions of BSANR can be expressed as follows for node i and neighbor j:

$$BSANR = (\forall j \exists NSi \supset NSj) \vee (\forall j \exists ((NSi \not\subset NSj)$$
$$\wedge ((NSi \supset NSj) \vee (NSi = NSj \wedge i > j))))$$

The last alternative definition of BSANR can be expressed as follows for node i and neighbor j where NSI is the intersection of the neighbor sets (NSs) of node i's neighbors and the degree(i) is a number representing how many neighbors node i has:

$$BSANR = (\forall j \in NSI \neq \phi \exists ((\text{degree}(i) = \text{degree}(j)) \wedge (i > j)))$$

It should be noted that a node's ID is a unique identifier assigned to the node. The identifier is preferably a random numeric or alphanumeric value assigned to the node and that differentiates the node from other nodes in the network. The ID can be conveniently assigned to the node when the communications equipment symbolized by the node is manufactured or initialized.

Bi-Stable Non-Artery Node Rule (BSNANR): Node i is a bi-stable non-artery node when one of the following alternative definitions is satisfied:

Node i's set of neighbors is a proper subset of the set of another node's neighbors; or
  Node i's set of neighbors is equal to another node's set of neighbors and node i's ID is less than (or greater than) the ID of the other node.
  all nodes in the intersection of the neighbor sets have the same number of neighbors where node i's ID is less than the ID of one of these said nodes or one of said nodes has more neighbors than node i.

The first two alternative definitions of BSNANR can be expressed as follows for node i and neighbor j:

$$BSNANR = (\exists j \exists ((NSi \subset NSj) \vee ((NSi = NSj) \wedge i < j)))$$

The last alternative definition of BSNANR can be expressed as follows for node i and neighbor j where NSI is the intersection of the NSs of node i's neighbors and the degree(i) is a number representing how many neighbors node i has:

$$BSNANR = (\exists j \in NSI \neq \phi \exists ((\text{degree}(i) < \text{degree}(j))))$$
$$\vee ((\forall j \in NSI \neq \phi \exists ((\text{degree}(i) = \text{degree}(j))))$$
$$\wedge (\exists j \in NSI \neq \phi \exists (i < j)))$$

Stable Non-Artery Node Rule (SNANR): If this node has a set of neighbors that is different from at least one of its neighbors' neighbor sets (i.e. the network is not fully connected) and its neighbors are either directly connected or they are connected by a stable artery node (SAN) as defined above, then node i is a stable non-artery node.

This can be expressed for node i and neighbors j and k and SAN s as:

$$SNANR = (\exists j \neq i \exists NSj \neq NSi) \exists (\forall j \neq k \exists [(j \in NSk)$$
$$\vee (\exists SANs \exists s \in NSj \cap NSk)])$$

If none of the Skeletal Node Rules apply to node i, the Artery Node Rule (ANR) can be applied using randomization delay techniques as previously described. The ANR can be expressed as follows for node i and neighbors j and k:

$$ANR = [ANNi - \{i\} = \phi / \vee / \exists j \neq k \exists (ANNj \cap ANNk) - \{i\} = \phi /$$

Figure 2:
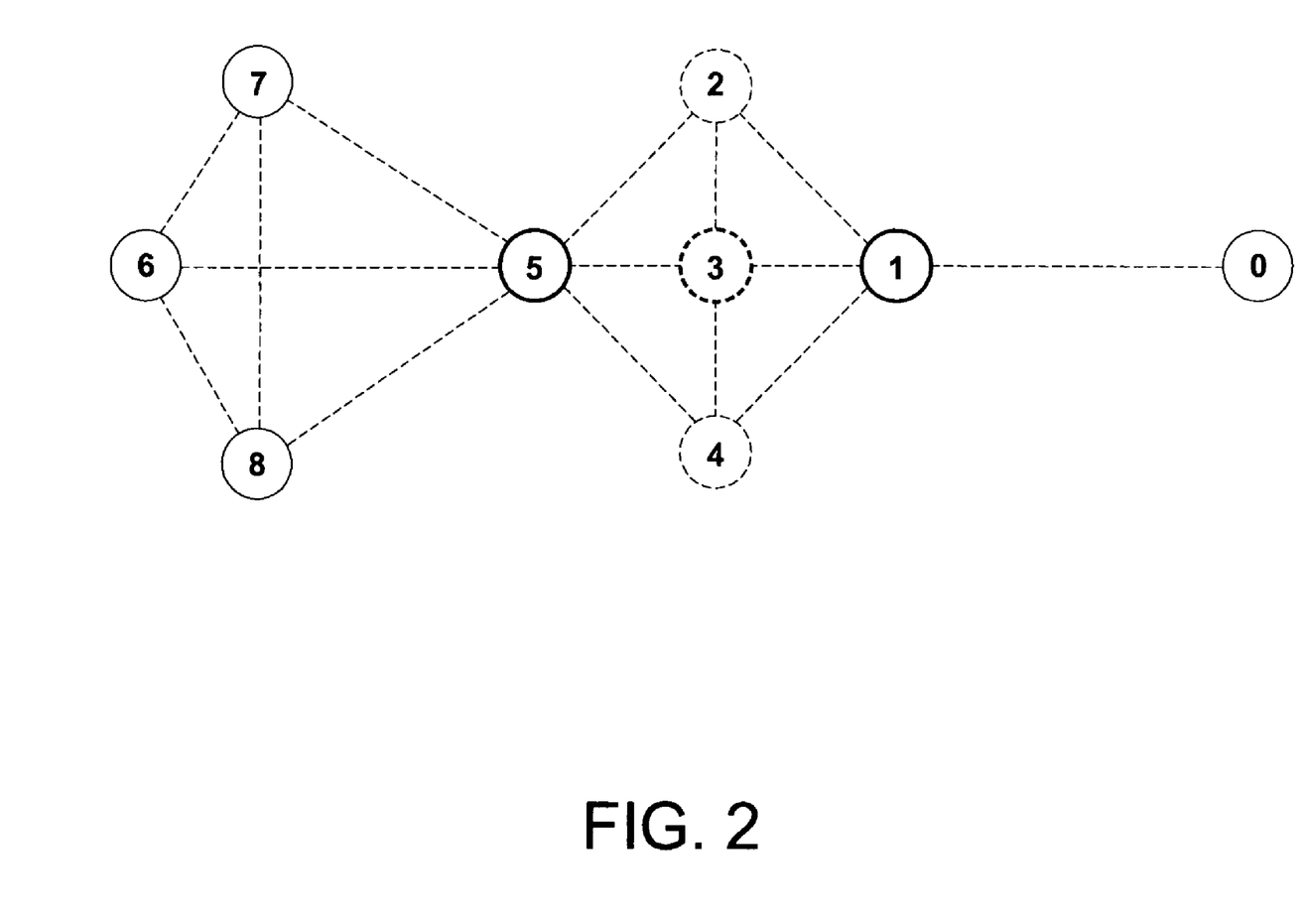
FIG. 2 is a schematic diagram of a communications network having artery nodes assigned according to the invention.

FIG. 2 is a schematic depiction of a network of nodes in which nodes defined by the Skeletal Node Rules are shown. Applying the Skeletal Node Rules to the nodes results in nodes 0, 6, 7, and 8 being assigned as stable non-artery nodes as defined by the Stable Non-Artery Node Rule. Nodes 1 and 5 are stable artery nodes as defined by the Stable Artery Node Rule. Nodes 2 and 4 are bi-stable non-artery nodes as defined by the Bi-Stable Non-Artery Node Rule. Node 3 is defined as an artery node using the Artery Node Rule with randomization as explained above.

Figure 3:
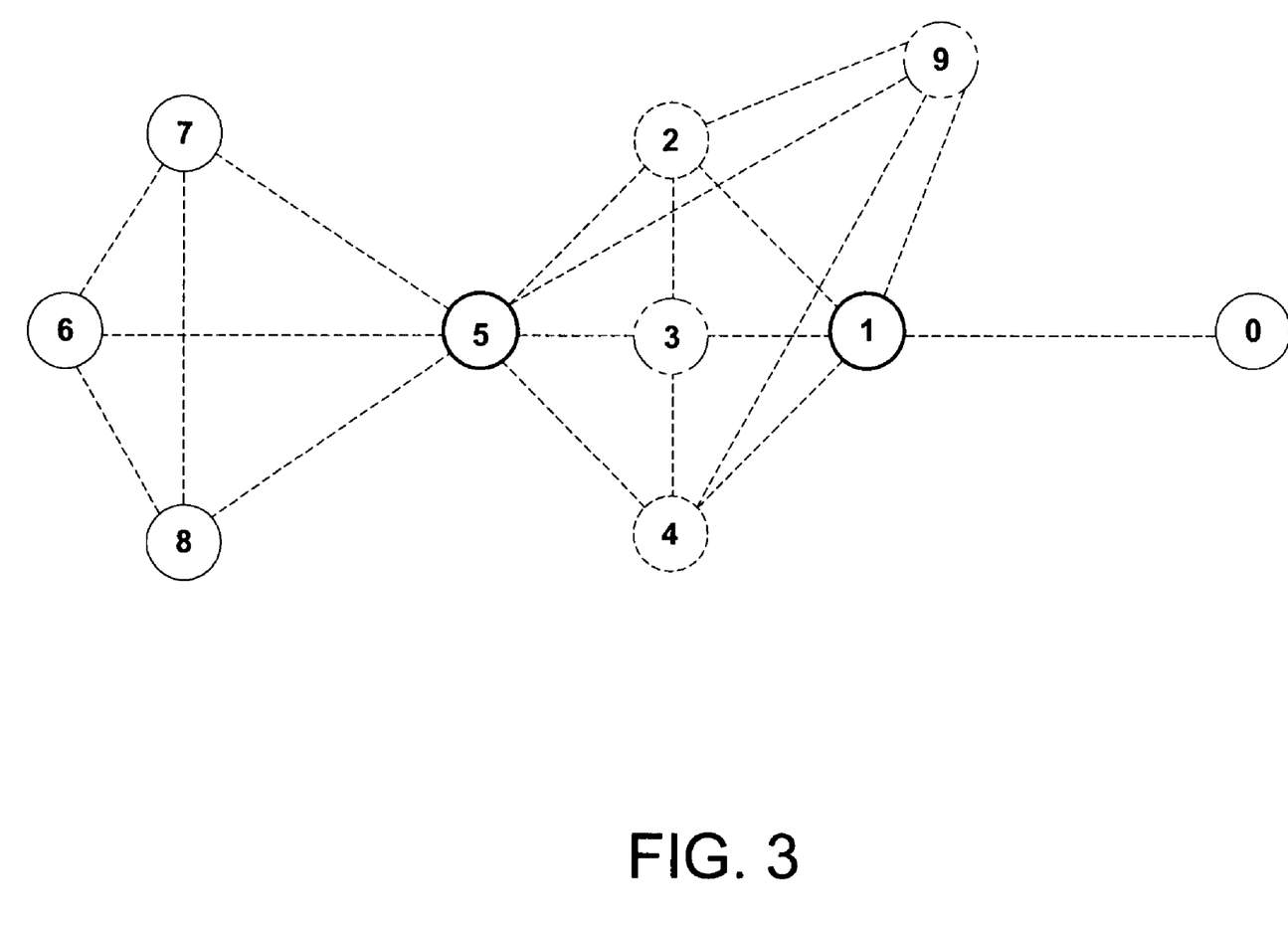
FIG. 3 is a schematic diagram of another communications network having artery nodes assigned according to the invention.

FIG. 3 shows another network that is similar in structure to the network shown in FIG. 2 and further includes a node 9 that has the same neighbors as node 3 but is not directly connected to node 3. In such a case, nodes 2, 3, 4 and 9 are bi-stable, and when the Skeletal Node Rules are applied, nodes 4 and 9 are determined to be bi-stable artery nodes, and nodes 2 and 3 is determined to be bi-stable non-artery nodes. Because none of the nodes in the network are required to use the Artery Node Rule with randomization techniques, the network quickly converges to an arterial network solution.

It is not necessary to apply the Skeletal Node Rules, i.e., the Stable Artery Node Rule, the Stable Non-Artery Node Rule, the Bi-Stable Artery Node Rule, and the Bi-Stable Non-Artery Node Rule, in any particular order. However, the Artery Node Rule with randomization should be applied to a node once the Skeletal Node Rules have been applied to a node and are ineffective in determining whether the node should be an artery node.

Figure 4:
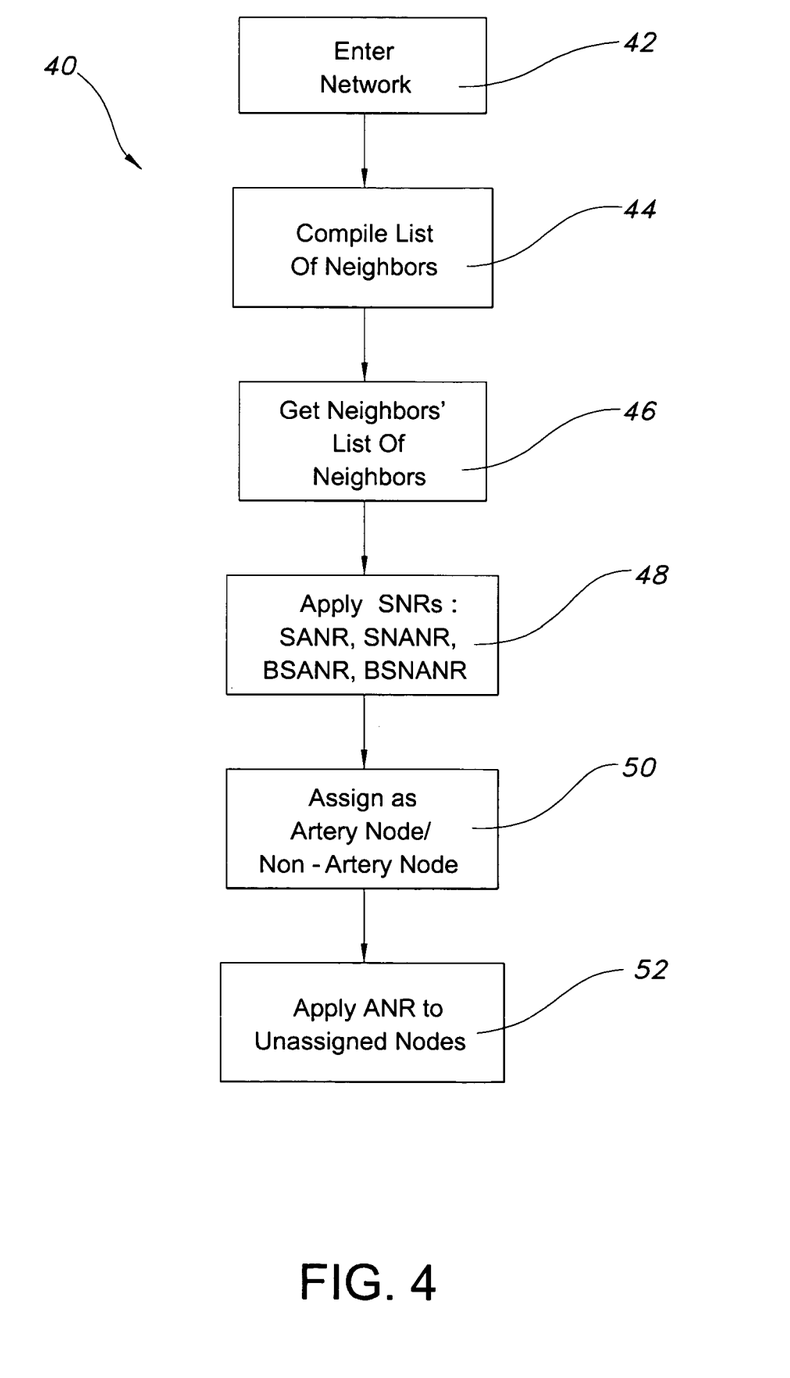
FIG. 4 is a flowchart of a method according to the invention.

FIG. 4 is a flowchart showing a method 40 according to the invention. For purposes of clarity, the method will refer to an exemplary node in a network as node A. In step 42 node A attempts to enter the network. In step 44 node A compiles a list of its neighbors. This is typically accomplished by monitoring incoming transmissions and adding to the list of neighbors any node directly communicating with node A. As previously defined, the neighbors of node A are those nodes within one communication hop of node A. Node A's neighbors also include node A itself. In step 46 node A obtains a list of neighbors for each node that is a neighbor of node A. To accomplish this, the communications protocol used by the network requires each node to transmit a list of its neighbors. In step 48 node A applies the Skeletal Node Rules, in any order, to its own neighbor list and the neighbor lists of each of its neighbors. The Skeletal Node Rules include the Stable Artery Node Rule, the Stable Non-Artery Node Rule, the Bi-Stable Artery Node Rule, and the Bi-Stable Non-Artery Node Rule. In step 50 node A is assigned as an artery node or a non-artery node if one of the Skeletal Node rules is applicable to the network connectivity of node A. In Step 52 node A is assigned to be an artery node or a non-artery node using the Artery Node Rule after a random or semi-random time delay if none of the Skeletal Node Rules apply to node A. The steps of the method may be repeated as often as desired, for example when one or more nodes enter or leave the network.

An advantage of the invention is that, for most typical network topologies, the Skeletal Node Rules (SNRs) greatly reduce the number of nodes which must apply the ANR with randomization. Stable and bi-stable nodes can immediately be identified and can assume artery or non-artery node status by applying the skeletal node rules, thus speeding convergence. In particular, the SNRs are very helpful in speeding convergence in a highly or fully connected network, precisely the cases that are most problematic for randomization.

Another advantage is that because artery nodes have prioritized access to communication time slots, a stable, efficient, and predictable sub-network is quickly created within a communications network.

Another advantage is that the Skeletal Node Rules can be easily implemented by each individual node in a network without a centralized control system. The Skeletal Node Rules create a self-converging solution in creating an artery node network.

While the invention has been disclosed in its preferred form, the specific embodiments thereof as disclosed and illustrated herein are not to be considered in a limiting sense as numerous variations are possible. The subject matter of the invention includes all novel and non-obvious combinations and subcombinations of the various elements, features, functions and/or properties disclosed herein. No single feature, function, element or property of the disclosed embodiments is essential to all of the disclosed inventions. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the invention of the present disclosure.

What is claimed is:

1. In an ad-hoc wireless communications network comprised of a plurality of nodes, a method of establishing an arterial sub-network of nodes such that each of the plurality of nodes in the communications network is within one hop of a node in the arterial sub-network, the anterial sub-network of nodes assigning slots to neighboring nodes, the method comprising steps of:
   (a) assigning a first node of the plurality of nodes to be part of the arterial sub-network when a set comprising the one-hop neighbors of the first node is a proper superset of each of the first node's one-hop neighbors' sets of neighbors;
   the method further including assigning the first node to not be a part of the arterial sub-network when one of the following is true:
   (b) the set of one-hop neighbors of the first node is a proper subset of another node's one-hop neighbors;
   (c) the set of one-hop neighbors of the first node is equal to a set of one-hop neighbors of a second node, and an identifier of the first node is different from an identifier of the second node such that the identifiers prioritize the second node over the first node;
   (d) the first node has a set of neighbors that is different from at least one of said first node's neighbors' neighbor sets and said first node's neighbors are either directly connected or they are connected by a node having one-hop neighbors that are reporting disjoint sets of one-hop neighbors,
   (e) all nodes in the intersection of the neighbor sets of said first node's neighbors have the same number of neighbors where said first node's identifier is less than the identifier of one of said all nodes or one of said all nodes has more neighbors than said first node;
   (f) the set of one-hop neighbors of said each node is equal to a set of one-hop neighbors of another node, and the identifier of said each node is different from an identifier of said another node such that the identifiers prioritize said another node over said each node,
   (g) all nodes in the intersection of the neighbor sets of said each node's neighbors have the same number of neighbors where said each node's identifier is less than the identifier of one of said all nodes or one of said all nodes has more neighbors than said each node, and
   (h) said each node has a set of neighbors that is different from at least one of said each node's neighbors' neighbor sets and said each node's neighbors are either directly connected or they are connected by the node having one-hop neighbors that are reporting disjoint sets of one-hop neighbors,
   and further wherein said each node is assigned to be part of the arterial sub-network when none of conditions (a), (b), (c), (d), (e), (f), (g), or (h) are true and when one of said each node has no one-hop neighbors that are part of the arterial sub-network, and
   two one-hop neighbors of said each node each have a set of neighbors excluding said each node that are part of the arterial sub-network wherein said sets of neighbors have no nodes in common are true.

2. The method of claim 1, the nodes in the arterial sub-network are assigned time slots that can be made available to non-artery nodes.

3. The method of claim 2, wherein skeletal node rules are utilized.

4. In a communications network comprised of a plurality of nodes, a method of establishing an arterial sub-network of nodes such that each of the plurality of nodes in the communications network is within one hop of a node in the arterial sub-network, the method comprising steps of:
   (a) assigning a first node of the plurality of nodes to be part of the arterial sub-network when a set comprising the one-hop neighbors of the first node is a proper superset of each of the first node's one-hop neighbors' sets of neighbors;
   the method further including assigning the first node to not be a part of the arterial sub-network when one of the following is true:
   (b) the set of on e-hop neighbors of the first node is a proper subset of another node's one-hop neighbors;
   (c) the set of one-hop neighbors of the first node is equal to a set of one-hop neighbors of a second node, and an identifier of the first node is different from an identifier of the second node such that the identifiers prioritize the second node over the first node;
   (d) the first node has a set of neighbors that is different from at least one of said first node's neighbors' neighbor sets and said first node's neighbors are either directly connected or they are connected by a node having one-hop neighbors that are reporting disjoint sets of one-hop neighbors, and
   (e) all nodes in the intersection of the neighbor sets of said first node's neighbors have the same number of neighbors where said first node's identifier is less than the identifier of one of said all nodes or one of said all nodes has more neighbors than said first node;
   further comprising assigning the first node to be a part of the arterial sub-network when one of the following is true:
   (f) a set comprising all one-hop neighbors of the first node is not a proper subset of any of the first node's one-hop neighbor's sets, where
      the set comprising the one-hop neighbors of the first node is a proper superset of at least one of the first node's one-hop neighbor's sets of neighbors, or
      the set comprising the one-hop neighbors of the first node is the same as the one-hop neighbor sets of each of the one-hop neighbors of the first node, and where the identifier of the first node is different from identifiers of the one-hop neighbors of the first node such that the identifier of the first node prioritizes the first node over the one-hop neighbors of the first node, and
(g) for the nodes of the set comprising the one-hop neighbors of the first node, the intersection of the neighbor sets of said nodes have the same number of neighbors where the identifier of said first node is greater than the identifiers of all the nodes in the intersection;
(h) assigning the first node of the plurality of nodes to be part of the arterial sub-network when the one-hop neighbors of the first node have sets of neighbors with no nodes in common
(i) assigning, after a time delay, the first node to be part of the arterial sub-network when none of conditions (a), (b), (c), (d), (e), (f), (g) or (h) apply to the first node and when one of
the first node has no one-hop neighbors that are part of the arterial sub-network, and
two one-hop neighbors of the first node each have a set of neighbors that excludes said first node and are part of the arterial sub-network, wherein said sets of neighbors are disjoint
is true.

5. The method of claim 4, wherein the time delay has a random value.

6. The method of claim 4, further comprising:
determining whether each node of the plurality of nodes is to be part of the arterial sub-network by applying conditions (a), (b), (c), (d), (e), (f), (g) and (h) to said each node; and
applying condition (i) to said each node when said each node is not assigned an artery node status after applying conditions (a)-(h) to said each node.

7. The method of claim 1, further comprising:
when the first node has not been assigned to be part of the arterial sub-network, assigning the first node to be part of the arterial sub-network when one of
the first node has no one-hop neighbors that are part of the arterial sub-network, and
two one-hop neighbors of the first node each have a set of neighbors that excludes said first node and are part of the arterial sub-network, wherein said sets of neighbors are disjoint
is true.

8. An ad-hoc communications network, comprising:
a plurality of nodes, each of the plurality of nodes having a set of one-hop neighbors, said one hop neighbors of each node being nodes directly communicating with said each node;
an arterial, connected sub-network within the plurality of nodes, the arterial sub-network configured to assign communication resources to adjacent nodes that are not part of the arterial sub-network, wherein each of the plurality of nodes are assigned to be part of the arterial sub-network when one of (a) the set of one-hop neighbors of said each node is a proper superset of each of said each node's one-hop neighbors' sets of neighbors,
(b) the set of one-hop neighbors of said each node is not a proper subset of any of said each node's one-hop neighbor's sets, where
the set of said each node's one-hop neighbors is a proper superset of at least one of said each node's one-hop neighbor's sets of neighbors, or
the set of said each node's one-hop neighbors is the same as the one-hop neighbor sets of each of said each node's one-hop neighbors, and where an identifier of said each node is different from identifiers of the one-hop neighbors of said each node such that the identifier of said each node prioritizes said each node over the one-hop neighbors of said each node,
(c) for the nodes of the set comprising the one-hop neighbors of a first node, the intersection of the neighbor sets of said nodes have the same number of neighbors where node i's identifier is greater than the identifiers of all the nodes in the intersection, and
(d) one-hop neighbors of said each node have unconnected sets of one-hop neighbors are true, and further wherein said each node is assigned to not be part of the arterial sub-network when one of
(e) the set of one-hop neighbors of said each node is a proper subset of another node's one-hop neighbors,
(f) the set of one-hop neighbors of said each node is equal to a set of one-hop neighbors of another node, and the identifier of said each node is different from an identifier of said another node such that the identifiers prioritize said another node over said each node,
(g) all nodes in the intersection of the neighbor sets of said each node's neighbors have the same number of neighbors where said each node's identifier is less than the identifier of one of said all nodes or one of said all nodes has more neighbors than said each node, and
(h) said each node has a set of neighbors that is different from at least one of said each node's neighbors' neighbor sets and said each node's neighbors are either directly connected or they are connected by a node having one-hop neighbors that are reporting disjoint sets of one-hop neighbors
are true, and further wherein said each node is assigned to be part of the arterial sub-network when none of conditions (a), (b), (c), (d), (e), (f), (g), or (h) are true and when one of
said each node has no one-hop neighbors that are part of the arterial sub-network, and
two one-hop neighbors of said each node each have a set of neighbors excluding said each node that are part of the arterial sub-network, wherein said sets of neighbors have no nodes in common
are true.

* * * * *